Figure 1:
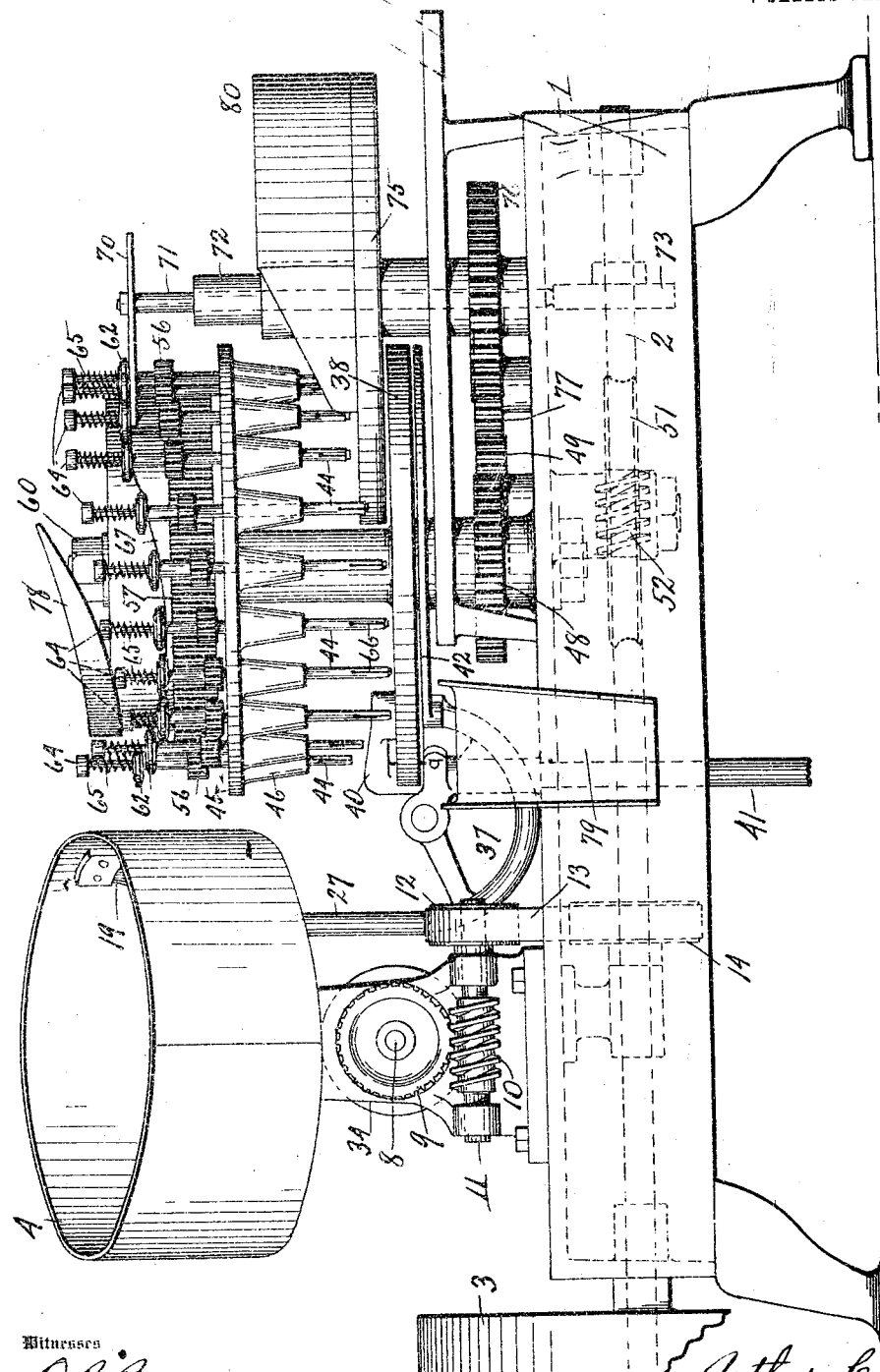

A. COLTON.
CAPSULE FILLING MACHINE.
APPLICATION FILED APR. 8, 1912.

1,077,392.

Patented Nov. 4, 1913.
7 SHEETS—SHEET 1.

Witnesses
O. B. Baenziger.
J. Otto Baenziger.

Inventor
Arthur Colton.
By E. S. Wheeler
Attorney.

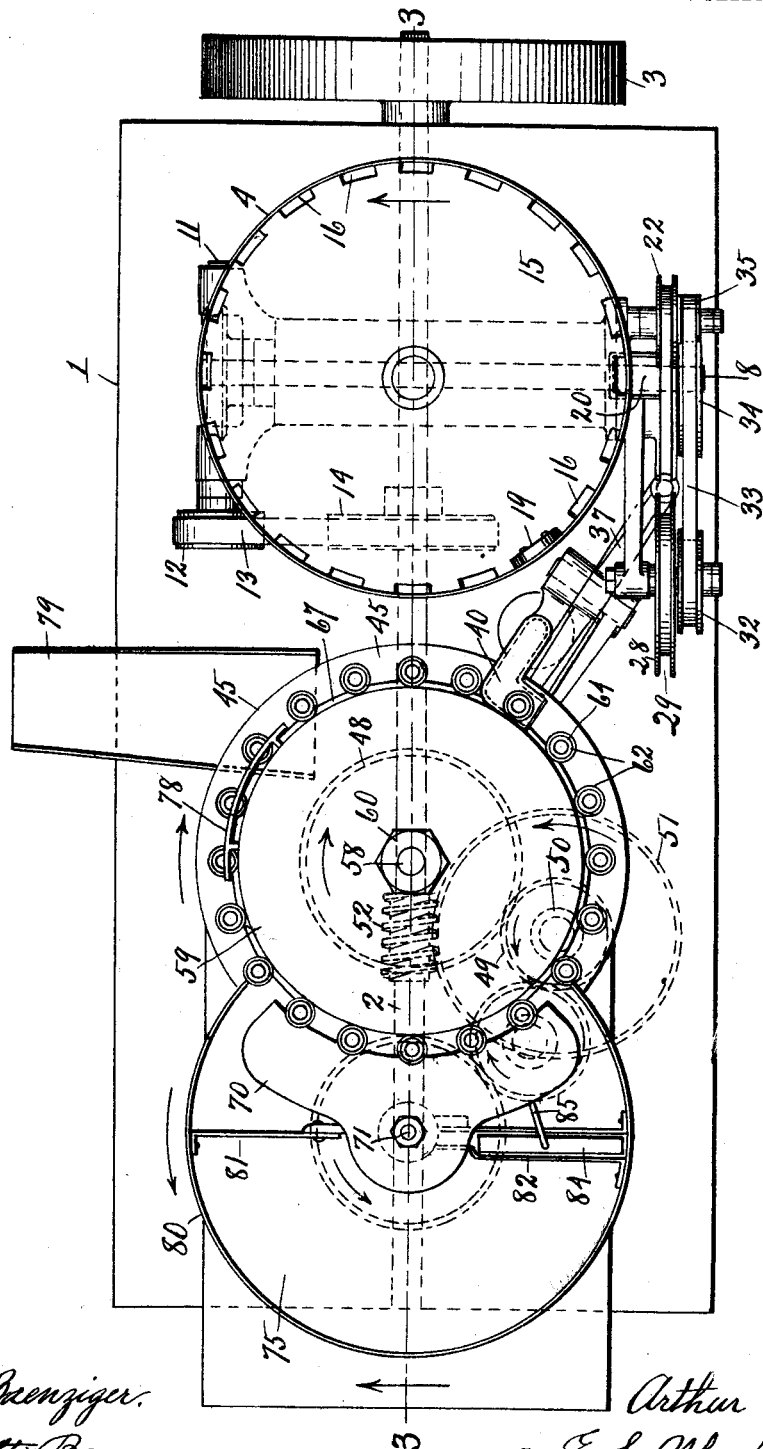

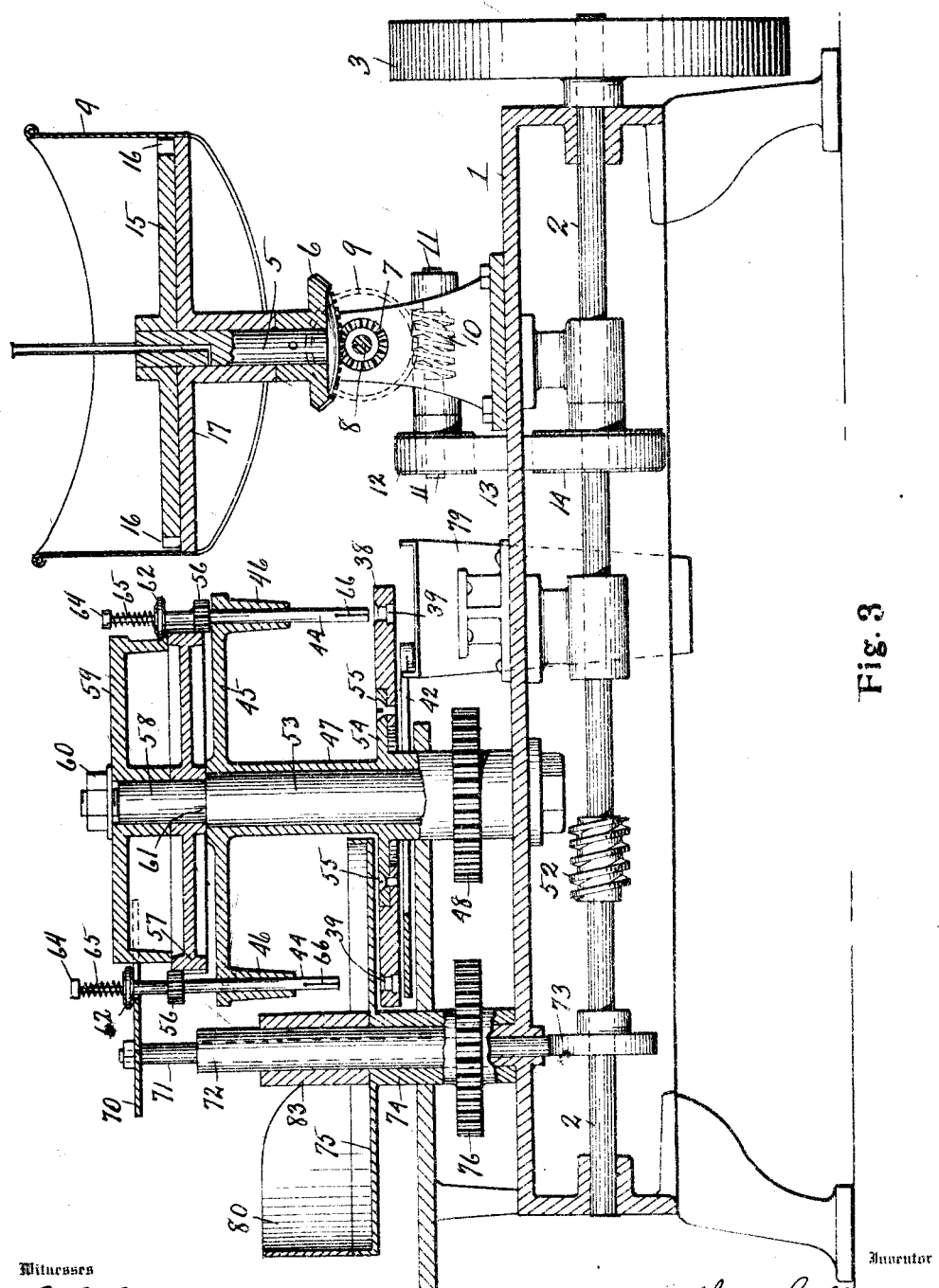

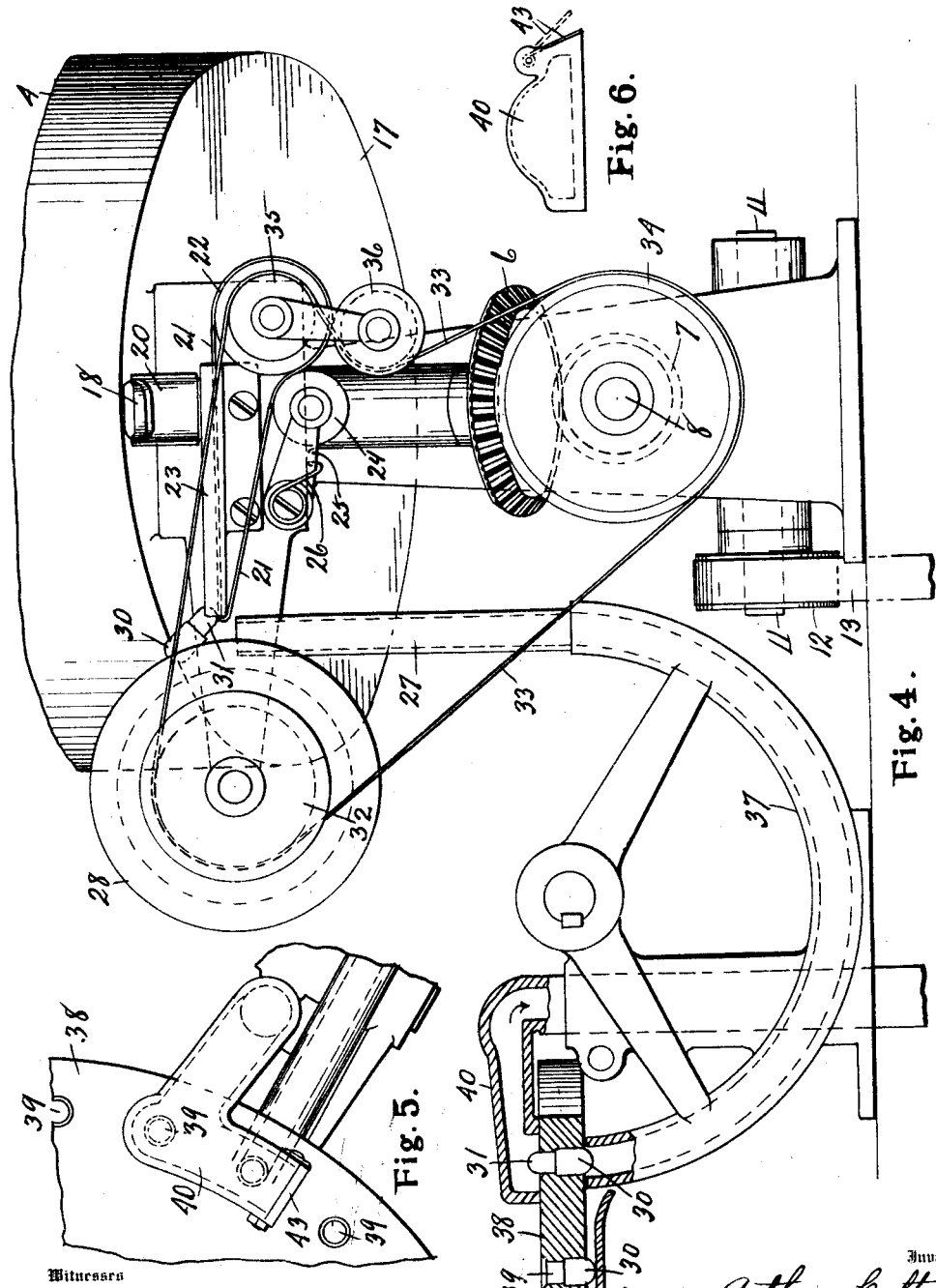

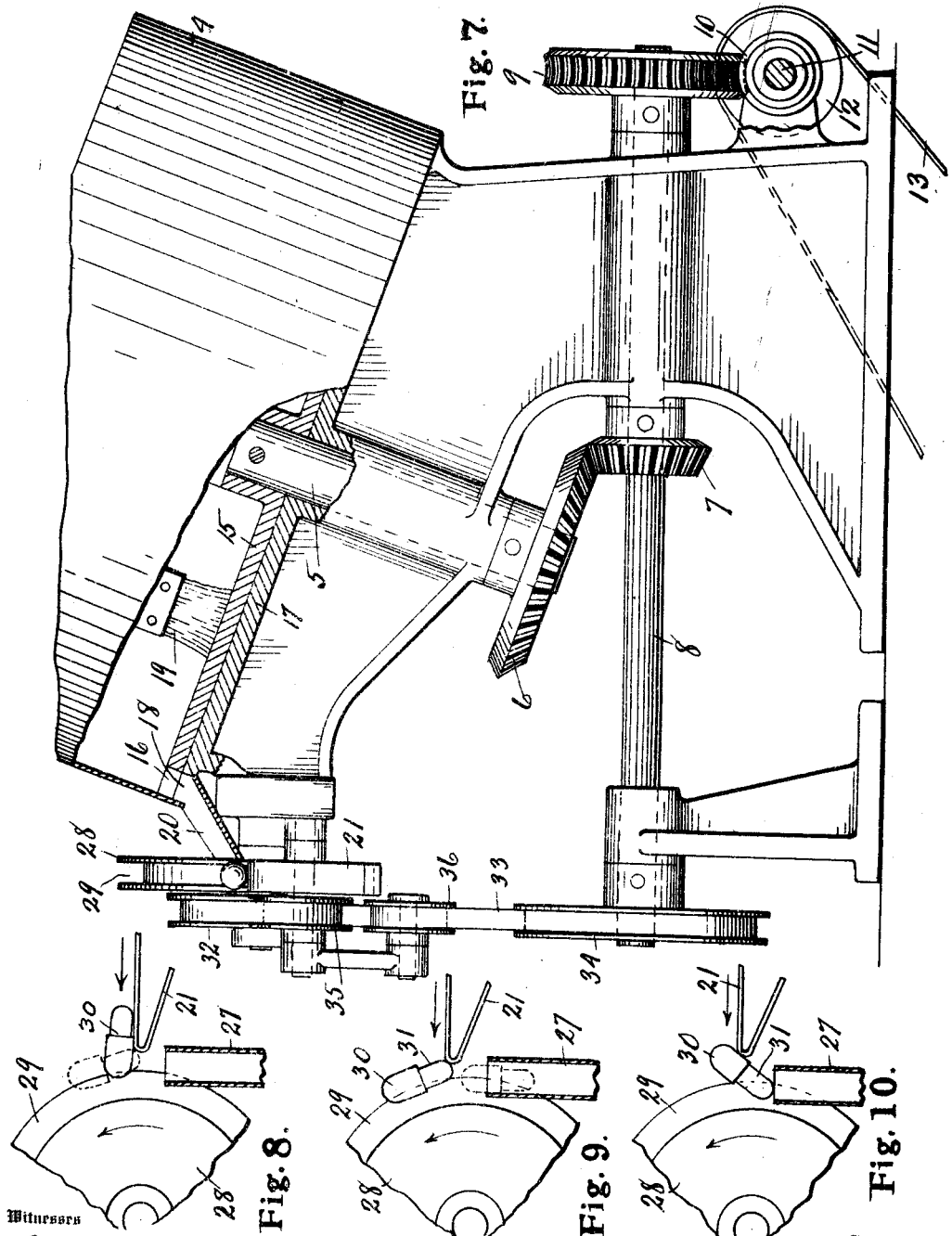

A. COLTON.
CAPSULE FILLING MACHINE.
APPLICATION FILED APR. 8, 1912.
1,077,392.
Patented Nov. 4, 1913.
7 SHEETS—SHEET 6.
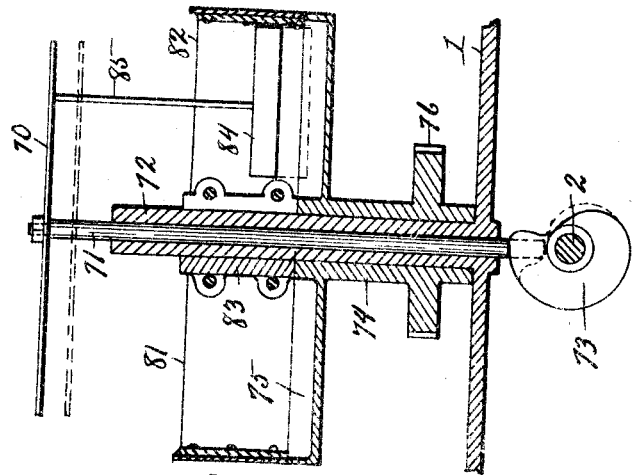
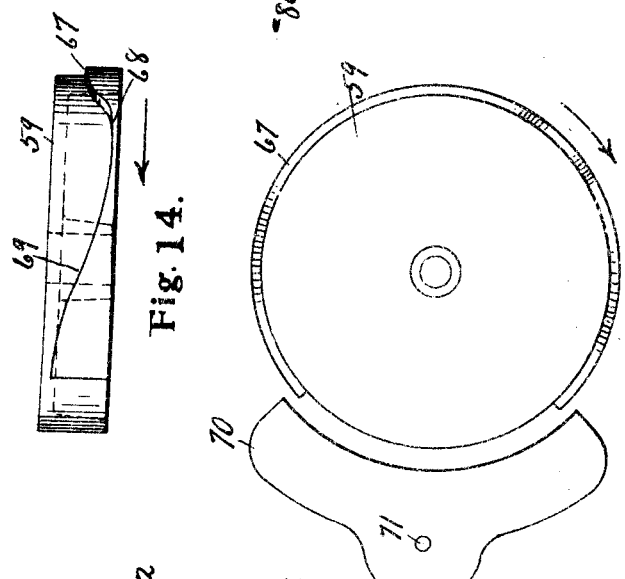
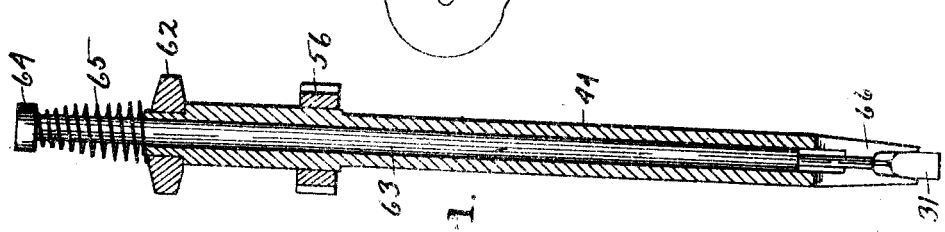
Witnesses
Q. B. Baenziger.
J. Otto Baenziger.
Inventor
Arthur Colton.
By E. S. Wheeler
Attorney.

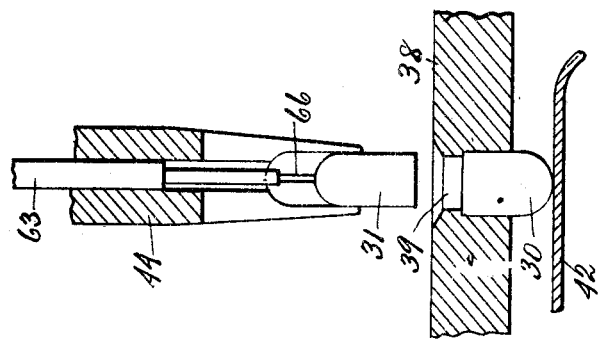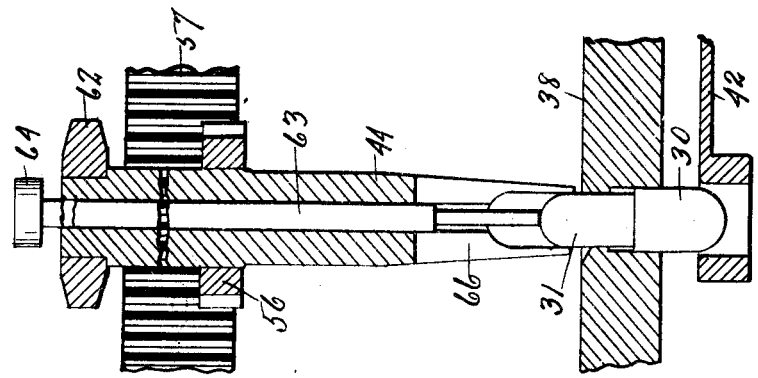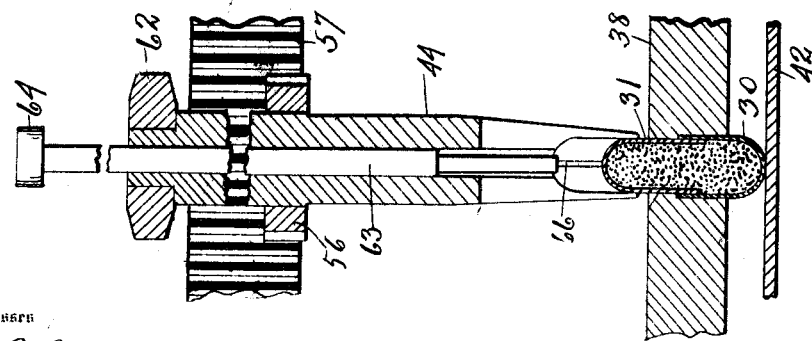

UNITED STATES PATENT OFFICE.

ARTHUR COLTON, OF DETROIT, MICHIGAN, ASSIGNOR TO ARTHUR COLTON COMPANY, OF DETROIT, MICHIGAN, A CORPORATION OF MICHIGAN.

CAPSULE-FILLING MACHINE.

1,077,392. Specification of Letters Patent. Patented Nov. 4, 1913.

Application filed April 8, 1912. Serial No. 689,341.

*To all whom it may concern:*

Be it known that I, ARTHUR COLTON, a citizen of the United States, residing at Detroit, in the county of Wayne, State of Michigan, have invented certain new and useful Improvements in Capsule-Filling Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to capsule filling machines, and consists in the construction and arrangement of parts hereinafter more fully set forth and pointed out more particularly in the claims.

The object of the invention is to provide comparatively simple and efficient means for automatically feeding gelatin capsules and arranging them in proper position; separating the caps from the bodies of the capsules; filling one of the parts of the capsules with medicine; joining the capsule parts to retain the medicine therein; and discharging the filled and joined capsules from the machine.

The invention contemplates such an operative association and arrangement of parts as will render unnecessary the granulating of the medicine prior to the operation of filling, and such further arrangement of parts as will enable an accurate filling of the capsules with respect to bulk or weight. The above object is attained by the mechanism illustrated in the accompanying drawings, in which:—

Figure 1 is an elevation of one side of the machine. Fig. 2 is a plan view thereof. Fig. 3 is a longitudinal sectional view as on line 3—3 of Fig. 2. Fig. 4 is a fragmentary view partly in section illustrating the manner of feeding the capsules to the traveling disk in which the operations of unjoining and joining the capsule parts take place. Fig. 5 is a fragmentary view in top plan of the suction head, a portion of the traveling disk, and a part of the spout through which the capsules are fed to said disk. Fig. 6 is an elevation of the suction head. Fig. 7 is an elevation partly in section of the mechanism for rotating the hopper in which the capsules are placed and of the means for feeding the capsules and presenting them in proper position to the tube in which they are conveyed to the traveling disk wherein they are unjoined prior to filling, and rejoined after being filled. Fig. 8 is a fragmentary view partly in section showing the means employed for presenting the capsules properly to the feeding tube when they reach said means in an improper position. Fig. 9 is a similar view showing how a capsule improperly presented will be directed properly into said tube. Fig. 10 is a similar view showing how a capsule reaching the tube in proper position will be directed into it without any further operation. Fig. 11 is an enlarged longitudinal section through one of the reciprocatory and rotary spindles in which the bodies of the capsules are held while being filled. Fig. 12 is a detail in section showing the rotary tray in which the medicine is contained from which the capsules are filled, and the means employed for maintaining said material at a constant level to insure a uniform filling of the capsules. Fig. 13 is a plan view of the rotary drum carrying the cam ring which raises and lowers the spindles, and of the plate which supports and reciprocates said spindles over the medicine tray. Fig. 14 is an edge elevation of said drum. Fig. 15 is a similar elevation from a different point of view. Fig. 16 is an enlarged fragmentary view in section illustrating the operation of unjoining a capsule. Fig. 17 is an enlarged fragmentary view in section illustrating the operation of joining a filled capsule. Fig. 18 is an enlarged fragmentary view in section showing the operation of discharging a filled capsule from the machine.

In the embodiment of the invention illustrated herein I have provided for a manipulation of the empty capsules so as to present them properly to a rotary disk in which they are unjoined, in which disk one of the capsule parts remains while the other part is being filled, and wherein the filled part is joined to the other part prior to the operation of discharging the filled capsule, the operation being such that the function of the machine in filling the capsules is similar to the operation of filling them by hand, insuring a uniformity in respect to the quantity or weight of the medicine with which the capsules are filled, and obviating the necessity of granulating the medicine or otherwise specially preparing it to enable a proper filling of the capsules.

Referring to the drawings by the characters of reference marked thereon, 1 designates the frame of the machine, which may be of any suitable construction, and in which is journaled the main driving shaft 2 turned through the medium of a pulley 3 mounted on the end thereof from any suitable source of power.

The empty capsules are placed in a hopper 4, the bottom 15 of which is mounted upon the upper end of an inclined shaft 5. The lower end of said shaft carries a beveled gear 6 which meshes with a beveled pinion 7 on the transverse shaft 8. Upon the outer end of shaft 8 is a worm gear 9 which meshes with a worm 10 on a short shaft 11. Upon shaft 11 is a pulley 12 driven by a belt 13 from a pulley 14 on the main shaft 2. By means of this arrangement the bottom 15 of the hopper 4 is caused to rotate at the desired speed. In the bottom 15 of the hopper at the perimeter thereof are pockets 16 adapted to receive an empty capsule. Below the rotary bottom of said hopper is a stationary bottom 17. Formed through said stationary bottom on the high side thereof, and at its perimeter, is a discharge opening 18 (see Fig. 7). Secured to the stationary wall of the hopper, and disposed so as to brush the rotary bottom 15 is a brush 19. As the rotary bottom of the hopper revolves the empty capsules will be carried upwardly thereon, and the brush 19, as the pockets in the hopper bottom pass thereunder, will brush therefrom all but one capsule so as to insure the depositing of an empty capsule in each of the pockets 16 of the hopper bottom, as said pockets, by the rotation of the bottom, are caused to successively pass said brush. Each of the pockets 16 as it reaches the high point in the rotation of the hopper bottom, will register with the opening 18 in the fixed bottom 17, causing the empty capsule to drop through said opening 18 onto a short inclined chute 20. At the lower end of the chute 20 is a belt conveyer 21 which passes over a driving pulley 22 (see Fig. 4). Said conveyer travels on the bottom of a trough guide 23 and loops over the end thereof, returning on the under side over the idle pulley 24 which is mounted on the pivoted arm 25 and is held in contact with the conveyer belt by the force of the spring 26, whereby said conveyer belt is kept at the proper tension.

In the operation of this machine it is necessary that the empty capsules be fed to the machine with the body portion thereof first or foremost. As the capsules are deposited onto the conveyer belt 21 haphazardly provision must be made for reversing the capsules in all cases where they are presented with the wrong end foremost, and for allowing the capsules which are properly presented to pass without interruption into the machine. To provide for reversing the capsules which are improperly presented, and to allow those which are properly presented to pass into the suction tube 27, there is employed a channeled wheel 28 which is so disposed as to stand adjacent the discharge end of the conveyer belt 21, and to partially embrace between the flanges thereof the upper end of the suction tube 27, an arrangement clearly illustrated in Fig. 4, the upper end of said tube being located just below the discharge end of the conveyer belt. The width of the channel 29 in the wheel 28 (see Fig. 7) is less than the diameter of the caps 30 of the capsules, but is of greater diameter than the bodies 31 of said capsules. Said wheel is driven to rotate to the left at a comparatively slow rate of speed. As an empty capsule is fed along on the conveyer belt 21, between the sides of the trough 23, should the cap 30 of said capsule extend foremost it will be carried into engagement with the channeled wheel 28, and because of the fact that the diameter of said cap is too large to enter the channel 29 in said wheel the cap will be engaged by the flanges of said wheel and its forward end will be lifted upwardly, as illustrated in Figs. 4, 8 and 9, until the body end of the capsule passes the end of the conveyer belt 21 when said capsule will drop into the upper end of the suction tube 27. Should the capsule be presented with the body portion thereof foremost it will not be acted upon by the wheel 28 owing to the fact that the diameter of said body portion is less than the width of the channel in said wheel, thereby allowing the capsule to tilt from the conveyer belt downwardly into the tube 27 with the body portion foremost, as clearly shown in Fig. 10. Movement is imparted to the channeled wheel 28 through the medium of the belt pulley 32 mounted on the shaft of said wheel 28 and receiving movement from the belt 33 which passes over a pulley 34 on the shaft 8, and over a second pulley 35 on the shaft of the pulley 22, said belt 33 being kept taut by means of the idle pulley 36, all more clearly shown in Fig. 4.

Connected with the lower portion of the straight tube 27 is a curved tube 37 (see Fig. 4) through which the capsules are drawn from the tube 27 in a manner hereinafter explained. Disposed in a horizontal plane above the free end of the curved tube 37 is a rotary disk 38 having capsule receiving cells or pockets 39 therein. Fitted over the upper face of the disk 38 above the point of communication of the curved tube 37 therewith is a hollow suction head 40 which is so disposed as to cause the cells or pockets 39 in the disk 38 to pass thereunder as said disk revolves. Connected with the hollow head 40 is an air suction pipe 41 which communicates with any suitable means for exhausting air so as to maintain a strong flow of air through said pipe and through the hollow head 40, whereby the capsules are drawn from the curved tube 27 into the pockets 39 of the disk 38 as fast as said pockets, by the rotation of said disk, are brought into alinement with the open end of the tube 37. By this means the cells or pockets of the disks 38 are successively filled with empty capsules as rapidly as said cells are presented over the open end of the tube 37. To hold the capsules in the cells of the disk 38 after they shall have been drawn thereinto by the operation of the suction head 40, there is provided below the disk 38 a supporting track 42 (see Fig. 4) which engages the caps of the capsules and prevents the capsules from falling from said cells or pockets.

In order to allow the upwardly extending ends of the bodies 31 of the capsules to pass from the hollow head 40 said head is provided with a hinged door 43 to close the end thereof, which will yield and swing upwardly as the projecting ends of the body portions of the capsules engage it, allowing the capsules to pass from said head without injury, the air suction being sufficient to return the door to its closed position after a capsule shall have passed thereunder.

The operation of unjoining the capsules or separating the bodies from the caps takes place immediately after the capsules pass from the suction head, and is accomplished through the medium of the rotatable and vertically reciprocatory spindles 44. These spindles are mounted in a rotary disk 45 to slide and revolve in the bearing sleeves 46 depending from said disk, and at the same time are carried in the arc of a circle as said disk revolves. Rotation is imparted to the disk 45 through the medium of a hollow shaft 47 (see Fig. 3) which carries said disk at its upper end. Movement is imparted to said hollow shaft through the medium of a gear 48, secured thereto near its lower end, meshing with a gear 49 on a short vertical shaft 50 mounted in the bed of the machine and carrying at its lower end a worm gear 51 which in turn meshes with a worm 52 on the main shaft 2. The hollow shaft 47 is supported by a vertical standard 53 which passes therethrough and is rigidly mounted in the bed of the machine. The disk 38, in which the capsule receiving cells 39 are formed, is mounted on the hollow shaft 47 to be revolved thereby through the medium of a ring 54 projecting therefrom to which the disk 38 is removably connected by screw bolts 55.

Upon each of the spindles 44 is a pinion 56 which meshes with the teeth of a circular rack 57 mounted on the reduced end 58 of the vertical standard 53. Also mounted on the reduced upper end 58 of the standard 53 is a cam drum 59 which is disposed over the rack 57, said drum and rack being locked to said standard by means of a nut 60, which, when screwed downwardly, forces the hub of the rack 57 against the shoulder 61 on the standard 53, whereby the rack and drum are held against rotation while the disk 45 is permitted to turn with the hollow shaft 47.

Upon the upper end of each of the spindles 44 is a collar 62. Each of said spindles 44 is hollow, and extending longitudinally therethrough is a vertically reciprocatory plunger 63 (see Fig. 11). Upon the upper end of each plunger is a cap 64, and embracing each plunger between the collar 62 of the spindle 44 and said cap is a compressible spring 65. The lower ends of the spindles 44 are slotted as shown at 66 to afford a slight spring action thereto, and in the lower end of said spindle is formed a socket adapted to receive the body portions 31 of the capsules. Passing nearly around the circumference of the cam drum 59 is a cam track 67 upon which the collars 62 of the spindles 44 are adapted to ride as said spindles are caused to travel in the arc of a circle through the rotation of the disk 45 in which they are seated. This cam track is provided with high and low points therein to effect a proper vertical movement of the spindles in succession during the circular travel thereof, for purposes hereinafter explained.

The arrangement is such that the disks 38 and 45 rotate in unison, and the spindles 44 are so positioned as to stand at all times in direct vertical alinement with the capsule cells 39 in the disk 38. As the disk 45 revolves the spindles 44 are carried around in a circle and are caused to revolve in their supporting sleeves 46 because of the engagement of the pinions 56 thereon with the teeth of the stationary rack 57. As the rotation of the disk 45 carries the spindles over the suction head 40 the formation of the cam track 67 is such as to lift said spindles so that their lower ends will carry over said suction head, as clearly shown in Fig. 1. After passing the suction head the spindles are allowed to drop by reason of the low point 68 in the cam track, as shown in Fig. 14. As said spindles drop at this point their lower ends engage over the body portions 31 of the capsules in the cells 39 of the disk 38, and because of the slight spring action due to the slots 66 therein the bodies of the capsules are clamped in the sockets of the spindles with sufficient tension to enable the spindles to withdraw the bodies 31 of the capsules from the caps 30 as said spindles are lifted by the incline 69 of the cam track, as shown in Fig. 16. By this arrangement the caps and bodies are unjoined, and while the bodies are retained in the sockets of the spindles the caps move around in timed relation therewith in the capsule cells of the disk 38. It will be noted on referring to Figs. 13, 14 and 15 that the cam track 67 is discontinued for a distance on one side of the drum 59. Spanning the space between the terminals of said cam track, and curved concentric with the drum, is a plate 70 which is fast to the upper end of a rod 71 adapted to reciprocate vertically through a standard 72 (see Fig. 12) rigidly supported from the bed of the machine. The lower end of the rod 71 extends through the standard 72 and bears upon a cam 73 secured to the main shaft 2. The shape of said cam is such that as the shaft 2 revolves the rod 71 is given a vertically reciprocatory movement, imparting a like movement to the plate 70. Mounted to rotate upon the standard 72 is a hollow shaft 74, carrying at its upper end a shallow tray 75 and having at its lower end a gear wheel 76. This gear wheel meshes with an idle gear 77 (see Fig. 1) which in turn meshes with the gear 49, which, as already explained, is driven from the worm 52 on the shaft 2, whereby a rotary movement at slow speed is imparted to the tray 75 which is adapted to contain the medicinal substance with which the capsules are filled. The collars 62 of the spindles 44, after leaving the terminal of the cam track, pass onto the plate 70 which is so disposed as to engage under said collars, the arrangement being such that a number of the spindles are carried by said plate at the same time, as clearly shown in Fig. 2. As the plate 70 reciprocates the spindles are quite rapidly lowered and raised during the period they are supported by said plate, and the arrangement of the parts is such that when the spindles are dropped by a downward movement of the plate 70 the capsule bodies carried in the lower ends thereof are dipped into the powdered medicinal substance carried in the slowly rotating tray 75, whereby the bodies of said capsules become filled with said substance, the number of the vertical operations of the spindles while passing over the powder carrying tray being regulated to cause the requisite quantity or weight of material to be picked up by each of the capsule bodies. As the circular movement of the disk 45 in which the spindles are mounted carries said spindles from the tray 75, the collars 62 of said spindles pass on to the opposite terminal of the cam track, thereby supporting the spindles on said track at an elevation to enable their lower ends to clear the margin of the tray 75. From the point where the spindles are deposited onto the cam track from the reciprocatory plate 70 said track descends, as shown in Fig. 1, allowing the spindles to assume a lower plane so that the filled bodies of the capsules held in their lower ends will be directed into the open ends of the caps held in the cells of the disk 38 and the capsule parts joined together as shown in Fig. 17. It will here be explained that the track 42 is circular and extends under the disk 38, affording a support to hold the caps of the capsules in the cells of the disk 38 during the travel of said disk from the point where the capsules are unjoined to the point where the capsule parts are joined after the bodies have been filled. To discharge the filled capsules from the machine, there is provided a curved cam track 78 which is disposed above the upper ends of the spindles in the path of travel of the caps 64 carried on the plungers 63 which pass through the spindles, so that as the disk 45 continues to revolve said plungers are depressed against the action of the springs 65 by the engagement of said caps with said cam track, causing the lower end of said plungers to engage the capsules and force them downwardly, so that upon reaching the terminal of the track 42 the filled capsules will be discharged from the cells in said disk, as shown in Fig. 18, into the trough 79 (see Fig. 1).

Mounted upon the outer margin of the medicine tray 75 is a semi-circular retainer 80, which is supported in position by the cross-pieces 81 and 82 extending from the wall of said retainer to a clamping member 83 (see Fig. 12) that embraces the standard 72, thereby supporting said retainer immovable in place. These cross-pieces in conjunction with the wall of the retainer form a receptacle for the powdered medicine, and the lower edges of said cross-pieces serve as gages to strike off the powder at the proper level in that portion of the tray into which the spindles carrying the capsule bodies are dipped. To give the powder in the tray into which the spindles are dipped the proper density it is tamped by means of a tamping bar 84 which is carried on the lower end of a rod 85 suspended from the reciprocatory plate 70, whereby said tamping bar is caused to reciprocate with said plate. The length of the rod 85 is such that upon each descent of the plate 70 it passes into the powdered material in the tray and slightly compacts it at the point where it passes under the partition or cross-piece 82, said cross-piece or partition being double as shown in Fig. 2 to form a guide for the vertical movement of the tamping bar.

The face of the rack 57 is sufficient to allow the pinions 58 of the spindles to slide up and down without disengagement with the teeth thereof. As the spindles are being constantly rotated while they are being dipped into the powder in the filling tray there is less liability of the powder becoming packed in the open end of the capsule body in a manner to prevent the proper filling thereof. It will further be noted that the rotary movement of the spindles at the time the bodies and caps are brought together after filling facilitates the joining of said parts.

It will now be understood that by means of this apparatus empty capsules may be fed into the machine and properly positioned to enter the capsule receiving cells in the rotary disk, that the capsules may be unjoined in said disk, and while the caps remain therein the bodies may be rapidly and accurately filled, and that after the operation of filling, the parts of the capsules may be joined and discharged from the machine in a perfect state, the operation of filling being so similar to that of hand filling as to enable the capsule bodies to be filled with the medicinal substance in its natural state without the necessity of previous granulation or other treatment.

Having thus fully set forth my invention, what I claim as new and desire to secure by Letters Patent, is:—

1. A machine for filling capsules, comprising capsule feeding mechanism, means for unjoining the capsule parts, a tray to contain medicinal substance, means for dipping the open end of a capsule part into said tray to fill it with said substance, and means for joining the capsule parts after the operation of filling.

2. A machine for filling capsules, comprising feeding means, a traveling member having therein a capsule receiving cell into which a capsule is directed, means for lifting one part of a capsule from the other while in said cell, a tray adapted to contain medicinal material, means for reciprocating the lifted part of the capsule in said tray to fill the open end thereof with medicine, and means for joining together the capsule parts in said cell after the operation of filling.

3. A capsule filling machine, comprising capsule feeding mechanism, a holder into which the capsule is fed, a vertically movable spindle to engage a part of the capsule and withdraw it from the part in said holder, a tray containing medicinal material, means for reciprocating said spindle over said tray to dip the open end of the capsule part carried thereby into said material, means for moving the spindle and capsule holder in unison to carry both parts beyond said tray, and means for actuating the spindle to join the capsule parts.

4. A machine for filling capsules, comprising capsule feeding mechanism, a movable holder into which a capsule is fed, a vertically movable spindle adapted to lift one part of a capsule from the other in said holder, a tray for medicinal material, means for carrying the spindle to said tray and from it, means for reciprocating said spindle over said tray to fill the capsule part carried thereby, and means for joining the capsule parts after the operation of filling.

5. A capsule filling machine, comprising capsule feeding mechanism, a movable holder into which the capsules are fed, a vertically movable spindle adapted to engage a capsule part in the holder and unjoin the capsule, a tray to contain medicinal material, means for carrying the spindle to said tray and from it, means for reciprocating the spindle over said tray to fill the capsule part, means for rotating said spindle, and means for joining the capsule parts after the operation of filling.

6. A capsule filling machine, comprising capsule feeding mechanism, a traveling member having cells into which the capsules are directed, a plurality of movable spindles adapted to engage capsule parts in said cells and unjoin the capsules, a tray to contain medicinal material, means for presenting a plurality of said spindles to said tray, means for reciprocating said spindles over said tray while they are moving across it to fill the capsule parts carried thereby, means for moving the traveling member concurrently with the movement of the spindles, and means for actuating the spindles to join the filled portions of the capsules to the portions remaining in the cells of the traveling member.

7. A capsule filling machine, comprising capsule feeding mechanism, a rotary disk having cells into which the capsules are fed, a plurality of reciprocatory spindles mounted to travel in a circle above said disk in vertical alinement with the cells therein, means for rotating said spindles about their axes while they are traveling in the arc of a circle, means for reciprocating the spindles vertically during their rotary travel, a tray for medicinal material over which the spindles pass, said spindles being adapted before reaching said tray to successively engage the capsule parts in the cells and lift one part from the other to unjoin them, said spindles retaining the lifted parts, means for reciprocating the spindles over said tray to fill the capsule parts carried thereby, means for actuating said spindles to join the filled parts to the parts remaining in the cells of the disk, and means for discharging the filled capsules.

8. A capsule filling machine, comprising feeding mechanism, a traveling disk having cells into which the capsules are fed, spindles adapted to successively engage the capsule parts in said cells and unjoin the capsules, said spindles retaining one of the capsule parts, a tray to contain medicinal material, means for presenting the spindles over said tray and reciprocate them to fill the capsule parts carried thereby, means for moving the spindles and disks to keep the cells in the disk in alinement with said spindles, means for actuating the spindles to present the capsule parts carried thereby to the parts in the disk to join the capsules, each spindle having a discharging plunger therein, and means for actuating said plunger to discharge the filled capsule.

9. A capsule filling machine, comprising capsule feeding mechanism, a suction tube to receive the capsules, a traveling disk having cells with which one end of said tube successively registers during the movement of said disk, and a suction head under which the cells in said disk successively pass, said head being disposed over the point of communication of the suction tube with said disk.

10. A capsule filling machine, comprising capsule feeding mechanism, capsule unjoining mechanism, a tray carrying medicinal material to which a part of a capsule is presented for filling, means for maintaining the powder in said tray at a given level, and capsule joining means.

11. In a capsule filling machine, capsule feeding mechanism comprising a capsule carrier upon which the capsules are conveyed, capsule unjoining mechanism, capsule filling mechanism, capsule joining mechanism, and means at the discharge end of said carrier for reversing the capsule when the large end thereof is presented foremost.

12. In a capsule filling machine, capsule feeding mechanism comprising a conveyer on which the capsules are deposited, a suction tube, means at the end of said conveyer for directing the small end of the capsules into said tube, and a traveling member having cells adapted to receive the capsules disposed to successively register with the discharge end of said tube as said member travels.

13. In a capsule filling machine, capsule feeding mechanism comprising a capsule carrier upon which the capsules are conveyed in horizontal position, means at the discharge end of said carrier for reversing the capsules when the large end thereof is presented foremost, and a feeding tube into which the capsules are directed.

14. In a capsule filling machine, capsule feeding mechanism comprising a carrier upon which the capsules are conveyed, a reversing wheel at the discharge end of said carrier for changing a capsule end for end, and a guide into which the capsules are deposited.

15. In a capsule filling machine, capsule feeding mechanism comprising a horizontally movable carrier, and a reversing wheel at the end of said carrier against which the capsules are directed.

16. In a capsule filling machine, capsule feeding mechanism comprising an endless carrier upon which the capsules are conveyed, means adjacent said carrier for reversing capsules, and a guide into which the capsules are deposited.

17. In a capsule filling machine, capsule feeding mechanism comprising a capsule carrier upon which capsules are conveyed, an upwardly traveling reversing member at the end of said carrier against which capsules are directed, and a guide to receive capsules.

18. In a capsule filling machine, capsule feeding mechanism comprising a capsule carrier upon which capsules are conveyed, and an upwardly moving channeled member at the end of said carrier against which capsules are directed by the movement of the carrier for reversing them.

19. A capsule filling machine comprising capsule feeding mechanism, a holder into which the capsule is fed, a vertically movable spindle to engage a part of the capsule and withdraw it from a part in said holder, means for filling one of the separated parts of the capsule with medicinal material, means for moving the spindle and capsule holder to carry them into registering alinement after the operation of filling, and means for joining the capsule parts.

20. A capsule filling machine comprising capsule feeding mechanism, a holder into which the capsule is fed, a vertically movable spindle to engage a part of the capsule and withdraw it from a part in said holder, means for filling one of the separated parts of the capsule with medicinal material, means for moving the spindle and capsule holder to carry them into registering alinement after the operation of filling, and means for actuating the spindle to carry the capsule part carried thereby into engagement with the capsule part in the holder to effect a joining of the capsule members.

21. In a capsule filling machine, the combination of a capsule feeding device comprising means for singling out capsules, means for carrying said capsules in longitudinal position to a selecting member, and a magazine adapted to receive the selected capsules.

22. In a capsule filling machine, the combination of a capsule feeding device comprising means for singling out capsules, means for presenting said capsules in longitudinal position to a position-rectifying device, and a magazine adapted to receive capsules from the rectifying device, substantially as described.

23. In a capsule filling machine, the combination of means for distributing capsules in single file upon a horizontal carrier, means at the discharge end of said carrier for rectifying the positions of the capsules, a magazine tube adapted to receive said capsules, means at the lower end of the magazine tube for delivering the capsules into receptacles in a carrier plate, means for unjoining the capsules, means for filling the capsules, and means for joining the capsules, substantially as described.

24. In a capsule filling machine, the combination of a position-rectifying mechanism for the capsules comprising a horizontally moving conveyer adapted to receive capsules in single file, a channeled wheel in the path of the capsules adapted to permit the capsule whose small end is presented to the wheel to tip the small end down into a receiving tube, and to raise the large end of the capsule whose large end is presented to said channeled wheel until said capsule drops with the small end down into the receiving tube, substantially as set forth.

In testimony whereof, I sign this specification in the presence of two witnesses.

ARTHUR COLTON.

Witnesses:
J. OTTO BAENZIGER,
HELEN R. MILLER.